United States Patent
Chang et al.

(10) Patent No.: US 9,450,488 B2
(45) Date of Patent: Sep. 20, 2016

(54) CONTROL CIRCUIT FOR MAINTAINING OUTPUT SIGNAL OF SWITCHING REGULATOR IN A SLEEP MODE AND METHOD FOR REGULATING ELECTRICAL SIGNAL

(71) Applicant: PHISON ELECTRONICS CORP., Miaoli (TW)

(72) Inventors: Cheng-Hui Chang, Hsinchu (TW); Wen-Lung Cheng, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 35 days.

(21) Appl. No.: 14/451,446

(22) Filed: Aug. 5, 2014

(65) Prior Publication Data
US 2015/0381046 A1  Dec. 31, 2015

(30) Foreign Application Priority Data
Jun. 26, 2014 (TW) .............................. 103122121 A

(51) Int. Cl.
*H02M 3/156* (2006.01)
*H02M 1/00* (2006.01)

(52) U.S. Cl.
CPC ..... *H02M 3/156* (2013.01); *H02M 2001/0035* (2013.01); *Y02B 70/16* (2013.01)

(58) Field of Classification Search
CPC Y02B 70/16; H02M 3/1582; H02M 3/1588; H02M 3/158; H02M 3/156; H02M 2001/0032
See application file for complete search history.

(56) References Cited

U.S. PATENT DOCUMENTS

| | | | | |
|---|---|---|---|---|
| 5,941,990 | A * | 8/1999 | Hiiragizawa | G06F 1/3203 713/310 |
| 6,396,252 | B1 * | 5/2002 | Culpepper | H02M 3/156 323/225 |
| 7,167,382 | B2 * | 1/2007 | Hachiya | H02M 3/156 363/24 |
| 7,800,351 | B2 | 9/2010 | Gan | |
| 2006/0022656 | A1 * | 2/2006 | Leung | H02M 3/157 323/283 |
| 2007/0080674 | A1 * | 4/2007 | Gray | H02M 3/1588 323/282 |
| 2008/0259648 | A1 * | 10/2008 | Ferianz | H02M 1/08 363/21.03 |
| 2009/0102448 | A1 * | 4/2009 | Wang | H02M 1/08 323/293 |
| 2009/0237053 | A1 * | 9/2009 | Gan | H02M 3/156 323/283 |

OTHER PUBLICATIONS

"Office Action of Taiwan Counterpart Application", issued on Mar. 3, 2016, p. 1-p. 8, in which the listed reference was cited.

* cited by examiner

*Primary Examiner* — Harry Behm
*Assistant Examiner* — Peter Novak
(74) *Attorney, Agent, or Firm* — Jianq Chyun IP Office

(57) ABSTRACT

A control circuit for the switching regulator and a method for regulating electrical signal are disclosed. The control circuit for the switching regulator includes a switching regulator and a clock control unit. The switching regulator regulates an output voltage according to a reference voltage and a feedback voltage. The clock control unit is coupled to the switching regulator, and the clock control unit includes an oscillator and a pulse blanking modulator. The oscillator provides an oscillation signal, and the pulse blanking modulator is configured to generate a control signal that blanks a portion of the oscillation signal. The clock control unit provides the control signal in order to maintain an output electrical signal in a sleep mode of the switching regulator within a predetermined range.

23 Claims, 8 Drawing Sheets

CONTROL CIRCUIT FOR MAINTAINING OUTPUT SIGNAL OF SWITCHING REGULATOR IN A SLEEP MODE AND METHOD FOR REGULATING ELECTRICAL SIGNAL

CROSS-REFERENCE TO RELATED APPLICATION

This application claims the priority benefit of Taiwan application serial no. 103122121, filed on Jun. 26, 2014. The entirety of the above-mentioned patent application is hereby incorporated by reference herein and made a part of this specification.

BACKGROUND

1. Technical Field

The invention relates to a control circuit for a switching regulator and a method for regulating electrical signal, and more particularly, the invention relates to a control circuit and a method for regulating electrical signal capable of allowing the switching regulator to maintain ultra low current consumption in a sleep mode.

2. Description of Related Art

In modern times, circuit systems often require a voltage regulator for providing an accurate output voltage to serve as a basis for the operation of other circuits. In many cases, switching regulators may self-generate one reference voltage, and then adjust aforesaid output voltage by utilizing an error amplifier and a feedback mechanism.

FIG. 1 is a schematic block diagram of a switching regulator according to the conventional technology. Referring to FIG. 1, a switching regulator 100 includes a regulator circuit 120, a clock generator 140, a feedback control circuit 150 and a sleep control unit 160. This conventional switching regulator is capable of regulating the output voltage according to a reference voltage VREF and a feedback voltage VFB. The regulator circuit 120 is configured to receive a driving signal in order to stabilize the output voltage within a predetermined electrical potential range. The clock generator 140 provides a clock signal OSC and a control signal ENH. The feedback control circuit 150 provides a feedback control mechanism according to the feedback voltage VFB and the reference voltage VREF.

FIG. 2 illustrates a signal waveform diagram of the switching regulator according to the conventional technology. When the switching regulator of FIG. 1 is in a no-load state or a light-load state, the switching regulator enters a sleep mode. Architecture of the sleep control unit 160 is configured to confine an upper limit (VH) and a lower limit (VL) of the feedback voltage VFB. As illustrated in FIG. 2, when VFB is greater than VH, in a latch (not illustrated) inside the sleep control circuit 160, a set terminal SET is equal to 1 and a reset terminal RESET is equal to 0. Accordingly, an output terminal Q1B of the latch is also equal to 0 (Q1B=0). In this case, a number of times for switching the clock signal OSC is reduced (OSC is converted into an OSC skip period). When the feedback voltage VFB is less than VL, in the latch, the set terminal SET is equal to 0, the reset terminal RESET is equal to 1, and the output terminal is also equal to 1 (Q1B=1=the control signal ENH). In this case, the clock signal OSC is normally switched. However, when the feedback voltage VFB falls between the upper limit and the lower limit (VL<VFB<VH), the output terminal Q1B is equal to the control signal (Q1B=ENH) and maintained at the previous state. Therefore, although this architecture is capable of reducing a current consumption, if an initial value of the feedback voltage VFB falls between the upper limit and the lower limit (VL<VFB<VH) when the switching regulator is switched from a normal mode to the sleep mode, the output terminal Q1B of the latch will still be maintained at the previous state. Accordingly, the control signal ENH is equal to Q1B so ENH and Q1B are both maintained to be 1, such that the switching regulator may constantly maintain in the normal mode and fail to dynamically adjust the current consumption.

Thus, in the conventional switching regulator, when the system enters the sleep mode, a specific amount of the current consumption may still exist at the output terminal of the switching regulator (e.g., the current consumption of each component in the switching regulator may still exist). As a result, in case of applications in batteries or portable electronic devices, a power supply of such system cannot satisfy market demands for low current consumption and longer battery usage time.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a control circuit for a switching regulator and a method for regulating electrical signal, which are capable of achieving ultra low current consumption in a sleep mode.

The invention proposes a control circuit for the switching regulator, which includes a switching regulator and a clock control unit. The switching regulator regulates an output voltage according to a reference voltage and a feedback voltage. The clock control unit is coupled to the switching regulator, and the clock control unit includes an oscillator and a pulse blanking modulator. The oscillator provides an oscillation signal, and the pulse blanking modulator is configured to generate a control signal that blanks a portion of the oscillation signal. The clock control unit provides the control signal in order to maintain an output electrical signal in a sleep mode of the switching regulator within a predetermined range.

In an embodiment of the invention, the clock control unit includes a frequency divider, a pulse blanking modulator, a logic operator. The frequency divider is coupled between the oscillator and the pulse blanking modulator, and configured to divide a frequency of the oscillation signal in order to generate a frequency-divided oscillation signal. When a sleep signal is received, the pulse blanking modulator generates the control signal according to the frequency-divided oscillation signal. In addition, the logic operator is coupled to the oscillator and the pulse blanking modulator, and configured to generate a clock signal according to the oscillation signal and the control signal.

In an embodiment of the invention, a pulse width of each of clock periods of the control signal in the sleep mode is substantially the same.

In an embodiment of the invention, the switching regulator includes a regulator adjusting circuit, a feedback control circuit and a logic driving circuit. The regulator adjusting circuit is coupled to the logic driving unit and the feedback control circuit. The regulator adjusting circuit includes a power circuit, a voltage division circuit and an output capacitor. The power circuit has a first terminal for receiving an operating voltage, a second terminal for receiving a gate voltage, and a third terminal coupled to a ground. The voltage division circuit is coupled to the power circuit, and configured to provide the feedback voltage. The output capacitor has a first terminal coupled to the voltage division circuit and the power circuit, and a second terminal coupled to the ground. The feedback control circuit is coupled to the regulator adjusting circuit and the logic driving unit. The feedback control circuit includes an operation amplifier and a comparator. The operation amplifier is coupled to the voltage division circuit and the reference voltage. The operation amplifier controls a magnitude of a first comparator input voltage according to an error between the reference voltage and the feedback voltage. The comparator is coupled to the clock control unit and the operation amplifier, and configured to compare the first comparator input voltage with a second comparator input voltage according to the control signal in order to generate a comparison result. The logical driving unit includes a latch and a logic driving circuit. The latch is coupled to the clock control unit and the comparator, and configured to receive a clock signal from the clock control unit and the comparison result from the comparator in order to generate a latch output. The logic driving circuit is coupled to the clock control unit and the latch, and configured to provide the gate voltage to the second terminal of the power circuit according to the control signal and the latch output.

In an embodiment of the invention, the regulator adjusting circuit further includes an inductor, having a first terminal coupled to the power circuit, and a second terminal coupled to the output capacitor and the voltage division circuit.

In an embodiment of the invention, the power circuit of the regulator adjusting circuit includes a first transistor and a second transistor. The first transistor has a drain coupled to a source of the second transistor, a gate coupled to the gate voltage, and a source coupled to the ground. The second transistor has a drain coupled to the operating voltage, a gate coupled to the gate voltage, and the source coupled to the drain of the first transistor.

In an embodiment of the invention, the feedback control circuit further includes an inductive current detection circuit and a slope compensation circuit, for generating the second comparator input voltage according to the control signal.

In an embodiment of the invention, the logical driving unit further includes a first group of amplifiers and a second group of amplifiers. The first group of amplifiers is serially connected between the logical driving circuit and the gate of the first transistor. The second group of amplifiers is serially connected between the logical driving circuit and the gate of the second transistor.

In an embodiment of the invention, the regulator adjusting circuit is a buck regulator adjusting circuit.

In an embodiment of the invention, the regulator adjusting circuit is a boost regulator adjusting circuit.

In an embodiment of the invention, the regulator adjusting circuit further includes a diode, coupled between the power circuit and the output capacitor. In addition, the regulator adjusting circuit is an inverting regulator adjusting circuit.

In an embodiment of the invention, the output electrical signal is an output voltage.

In an embodiment of the invention, the output electrical signal is an output current.

In an embodiment of the invention, the clock control unit adjusts the control signal according to the output voltage in order to blank the at least the portion of the oscillation signal.

In an embodiment of the invention, the clock control unit adjusts the control signal according to the current load in order to blank the at least the portion of the oscillation signal.

In an embodiment of the invention, the control signal is a fixed value.

The invention proposes a method for regulating electrical signal, adapted to a control circuit for a switching regulator, wherein the control circuit for the switching regulator includes a switching regulator, an oscillator, a pulse blanking modulator, and the method for regulating electrical signal includes: receiving a reference voltage and a feedback voltage by the switching regulator; providing an oscillation signal by the oscillator; generating, by the pulse blanking modulator, a control signal that blanks at least a portion of the oscillation signal; and providing the control signal by the pulse blanking modulator to the switching regulator in order to maintain the output electrical signal in a sleep mode of the switching regulator within a predetermined range.

In an embodiment of the invention, the step of generating, by the pulse blanking modulator, the control signal that blanks at least the portion of the oscillation signal includes: dividing a frequency of the oscillation signal by the frequency divider to generate a frequency-divided oscillation signal, wherein when a sleep signal is received by the pulse blanking modulator, the pulse blanking modulator generates the control signal according to the frequency-divided oscillation signal. In addition, the logic operator generates the clock signal according to the oscillation signal and the control signal.

In an embodiment of the invention, the output electrical signal is an output voltage.

In an embodiment of the invention, the output electrical signal is an output current.

In an embodiment of the invention, the pulse blanking modulator adjusts the control signal according to the output voltage in order to blank the at least the portion of the oscillation signal.

In an embodiment of the invention, the pulse blanking modulator adjusts the control signal according to a current load in order to blank the at least the portion of the oscillation signal.

In an embodiment of the invention, the control signal is a fixed value.

Based on above, according to the embodiments of the invention, in the control circuit for the switching regulator and the method for regulating electrical signal, the clock control unit with the pulse banking modulation mechanism is adopted. Accordingly, as long as a proper capacitance of the output capacitor and the clock period of the control signal can be obtained through calculation, the control circuit for the switching regulator of the invention is capable of maintaining the output electrical signal of the voltage regulator within the normal operation range. Moreover, it can also be ensured that the switching regulator still different types may include the ultra low standby operating current in the sleep mode. In addition, since the pulse width of each of the clock periods of the control signal of the control circuit of the invention in the sleep mode is substantially the same and the pulse width is not related to the feedback voltage, the control circuit for the switching regulator may include a compact design.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
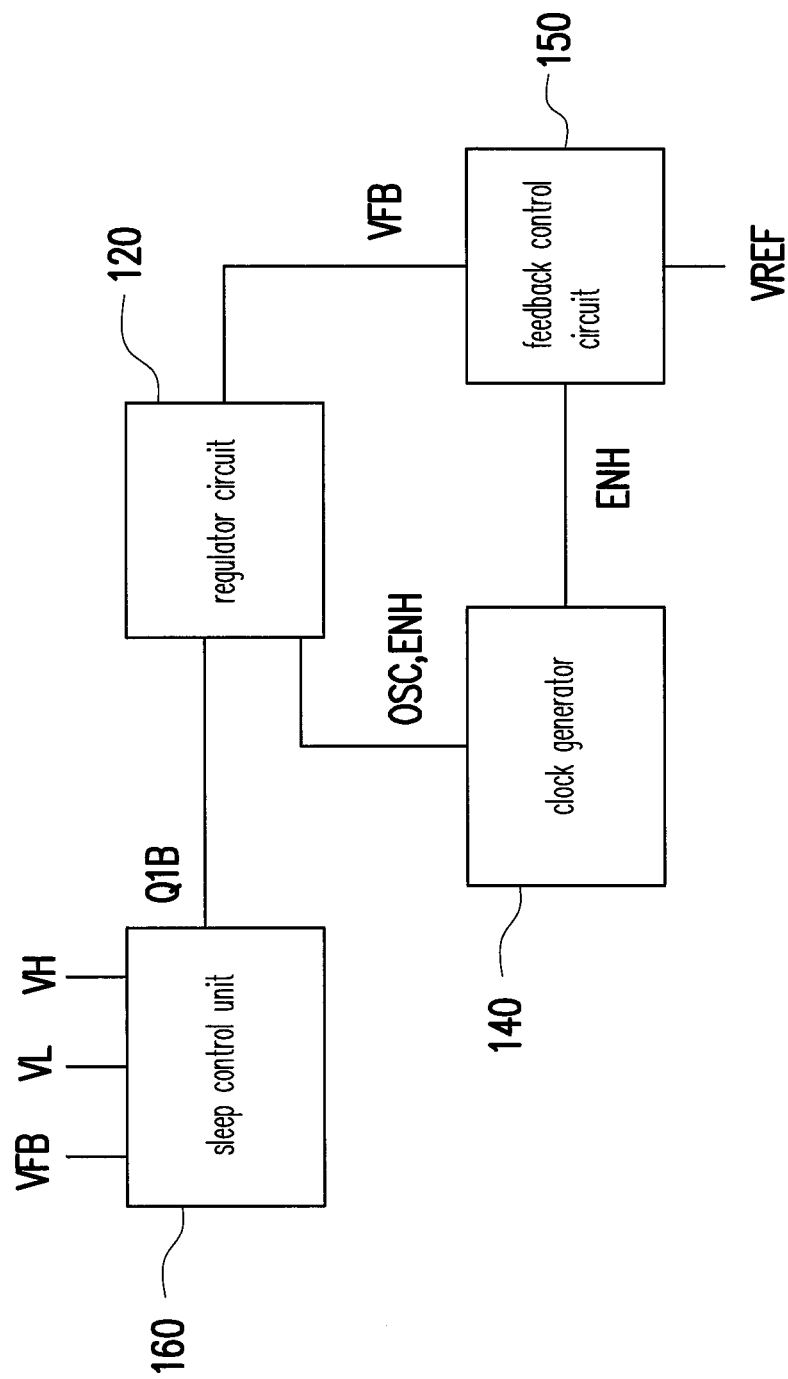
FIG. 1 is a schematic block diagram of a switching regulator according to the conventional technology.
Figure 2:
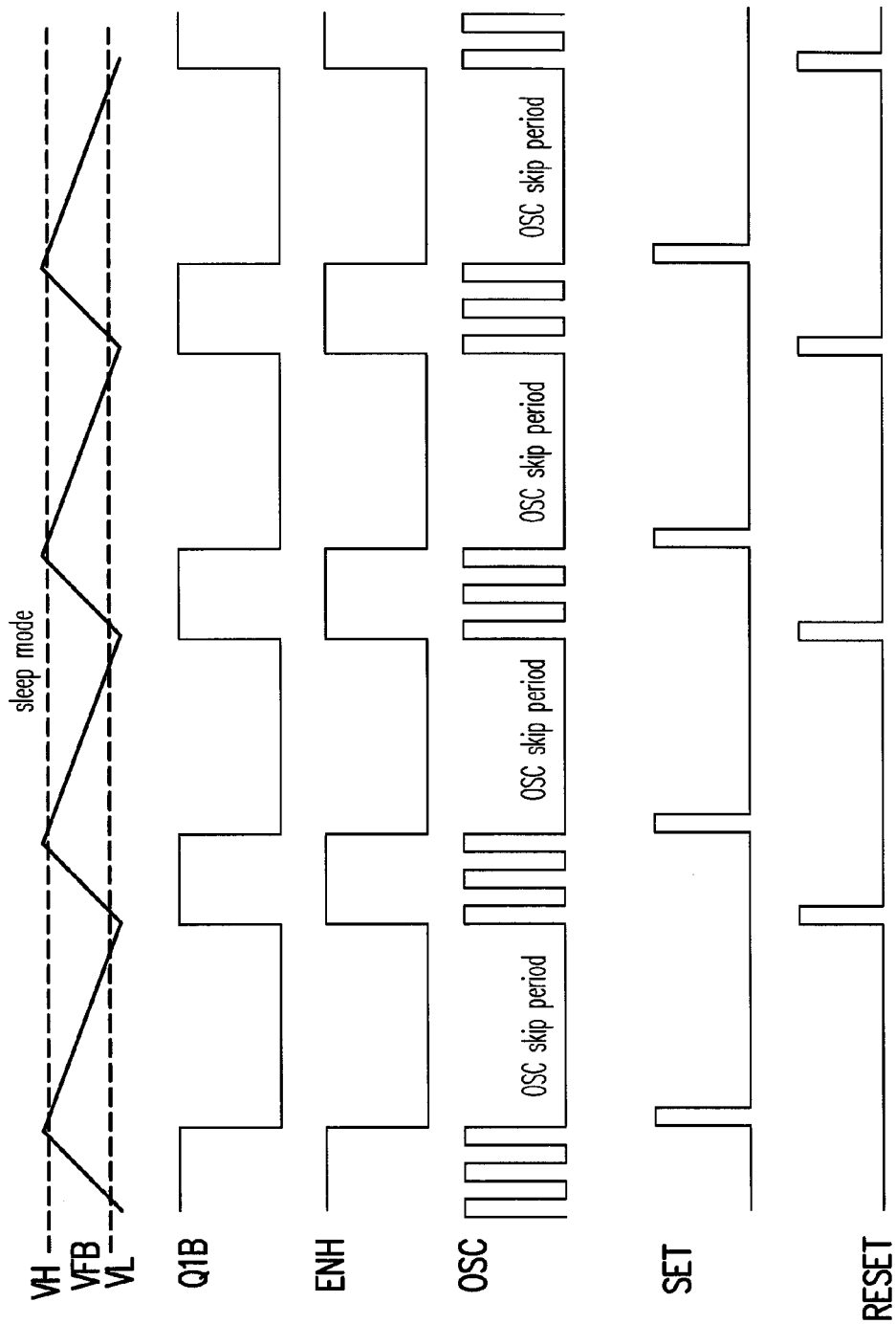
FIG. 2 illustrates a signal waveform diagram of the switching regulator according to the conventional technology.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Descriptions of the invention are given with reference to the exemplary embodiments illustrated with accompanied drawings, in which same or similar parts are denoted with same reference numerals. Moreover, elements/components/notations with same reference numerals represent same or similar parts in the drawings and embodiments.

Exemplary embodiments are provided below to describe the invention in detail, though the invention is not limited to the provided exemplary embodiments, and the provided exemplary embodiments can be suitably combined. The term "coupling/coupled" used in this specification (including claims) may refer to any direct or indirect connection means. For example, "a first device is coupled to a second device" should be interpreted as "the first device is directly and electrically connected to the second device" or "the first device is indirectly and electrically connected to the second device through other devices or connection means." In addition, the term "signal" can mean a current, a voltage, a charge, a temperature, data or any one or multiple digital or analog signals.

Figure 3:
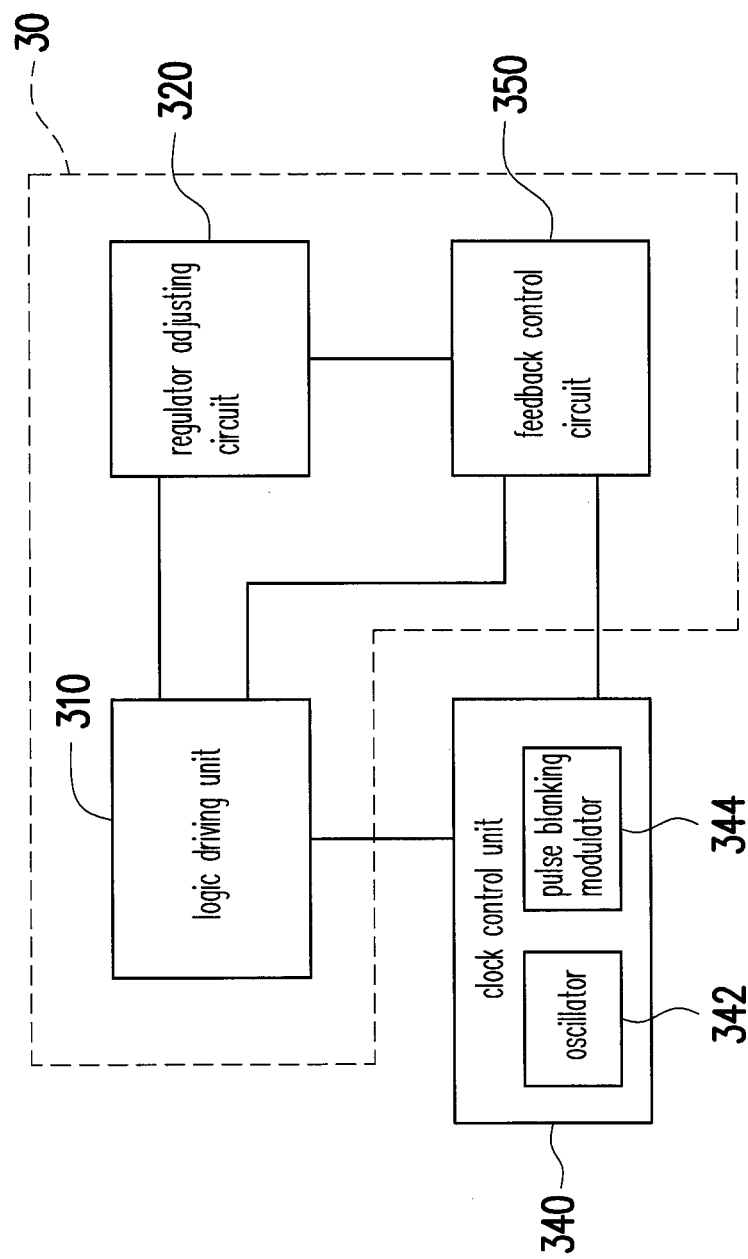
FIG. 3 is a schematic block diagram of a control circuit for a switching regulator according to an embodiment of the invention.

FIG. 3 is a schematic block diagram of a control circuit for a switching regulator according to an embodiment of the invention. Referring to FIG. 3, the control circuit 300 for the switching regulator includes a switching regulator 30 and a clock control unit 340. In the present exemplary embodiment, the switching regulator 30 includes a logic driving unit 310, a regulator adjusting circuit 320 and a feedback control circuit 350. The switching regulator 30 is capable of regulating an output voltage according to a reference voltage and a feedback voltage. In the present exemplary embodiment, the regulator adjusting circuit 320 is coupled to the logic driving unit 310 and the feedback control circuit 350. In the present exemplary embodiment, the clock control unit 340 is coupled to logic driving unit 310 and the feedback control circuit 350 of the switching regulator, wherein the clock control unit 340 includes an oscillator 342 and a pulse blanking modulator 344. The oscillator 342 provides an oscillation signal, and the pulse blanking modulator 344 is configured to generate a control signal that blanks a portion of the oscillation signal. In addition, the clock control unit 340 provides the control signal in order to maintain an output electrical signal in a sleep mode of the switching regulator within a predetermined range. Since clock control unit 340 of the control circuit for the switching regulator 300 can provide a pulse banking modulation mechanism, the control circuit 300 is capable of overcoming the problem of conventional technology in which the switching regulator cannot save power consumption in the sleep mode under specific states.

Figure 4:
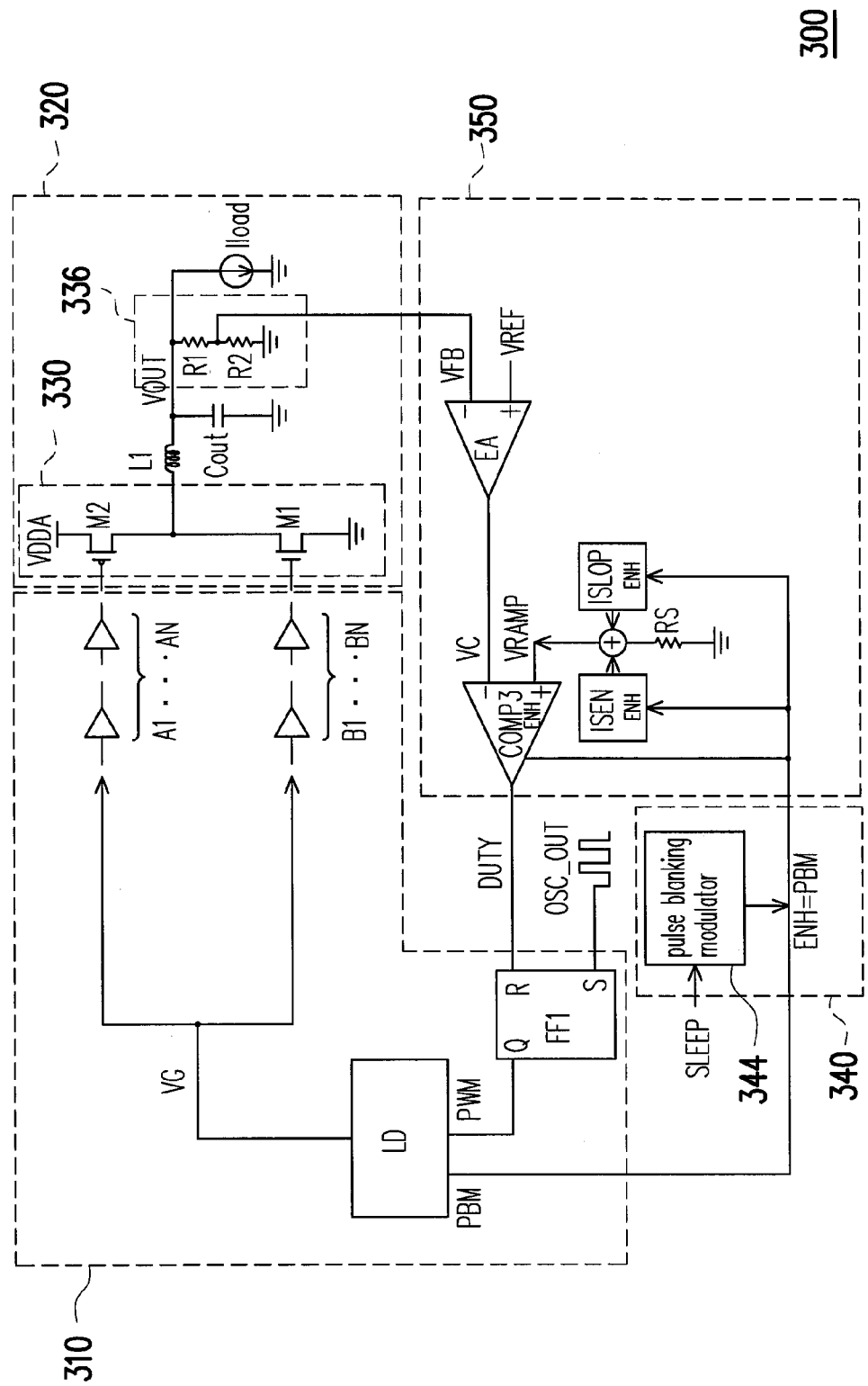
FIG. 4 is a schematic diagram of a control circuit for the switching regulator according to an embodiment of the invention.

FIG. 4 illustrates a schematic diagram of a control circuit for the switching regulator according to an embodiment of the invention. Referring to FIG. 4, the regulator adjusting circuit 320 includes a power circuit 330, a voltage division circuit 336 and an output capacitor Cout. In the present exemplary embodiment, the regulator adjusting circuit 320 is configured to receive a driving signal of the logic driving unit 310 in order to stabilize an output voltage VOUT within a predetermined electrical potential range. The power circuit 330 has a first terminal for receiving an operating voltage VDDA, a second terminal for receiving a gate voltage VG, and a third terminal coupled to a ground. The voltage division circuit 336 includes resistors R1 and R2, and has a terminal for providing a feedback voltage VFB and another terminal coupled to the ground. The output capacitor Cout has a first terminal coupled to the voltage division circuit and the power circuit, and a second terminal coupled to the ground. The regulator adjusting circuit 120 further includes an inductor L1 which has a first terminal coupled to the power circuit 330, and a second terminal coupled to the output capacitor Cout, the voltage division circuit 336 and a current load Iload.

In the present exemplary embodiment, the feedback control circuit 350 is coupled to the regulator adjusting circuit 320 and the logic driving unit 310. In addition, the feedback control circuit 350 outputs a comparison result DUTY by utilizing an operation amplifier EA according to the feedback control VFB and the reference voltage VREF and provides a feedback control mechanism. In the present exemplary embodiment, the feedback control circuit 350 includes the operation amplifier EA, a voltage comparator COMP3, an inductive current detection circuit ISEN, a slope compensation circuit ISLOP and a resistor RS. The operation amplifier EA is coupled to the voltage division circuit 336 and the reference voltage VREF. It should be noted that, the reference voltage VREF of the invention may be a fixed voltage generated by a reference voltage generator (not drawn). The operation amplifier EA may be an error amplifier, which controls a magnitude of a first comparator input voltage VC according to an error between the reference voltage VREF and the feedback voltage VFB. The inductive current detection circuit ISEN and the slope compensation circuit ISLOP generate a second comparator input voltage VRAMP according to the control signal ENH. The second comparator input voltage VRAMP may be converted by adding a current from inductive current detection circuit ISEN and a current from the slope compensation circuit ISLOP which flow through the resistor RS. The first comparator input voltage VC and the second comparator input voltage VRAMP may be sent to a negative terminal and a positive terminal of the voltage comparator COMP3 at the next stage, respectively. The first comparator input voltage VC is compared with the second comparator input voltage VRAMP according to the control signal ENH in order to generate the comparison result DUTY.

The logic driving unit 310 is coupled to the clock control unit 340 and the feedback control circuit 350, and controls on/off state of switch elements in the power circuit 330 according to a clock signal OSC_OUT and the comparison result DUTY. In the present exemplary embodiment, the logic driving unit 310 includes a latch FF1 (e.g., a SR latch FF1) and a logic driving circuit LD. The latch FF1 has a first terminal R for receiving the comparison result DUTY from the comparator, and a second terminal S for receiving a clock signal OSC from the clock control unit 340, so as to generate a latch output PWM to be transmitted from an output terminal Q to the logic driving circuit LD. The logic driving circuit LD provides the gate voltage VG to the second terminal of the power circuit 130 according to a control signal PBM and the latch output PWM, wherein the control signal PBM and the control signal ENH are substantially the same. In the present exemplary embodiment, the phrase "substantially the same" means that a level of similarity between two comparing target objects is at least not less than 70%. In addition, in the present exemplary embodiment, the power circuit 330 of the regulator adjusting circuit 320 includes a first transistor M1 and a second transistor M2. The first transistor M1 has a drain coupled to a source of the second transistor, a gate coupled to the gate voltage VG, and a source coupled to the ground. The second transistor M2 has a drain coupled to the operating voltage VDDA, a gate coupled to the gate voltage VG, and a source coupled to the drain of the first transistor. The first transistor M1 and the second transistor M2 may be a metal-oxide-semiconductor field-effect transistor (MOSFET), but the invention is not limited thereto. In addition, in some embodiments of the invention, the logic driving logic unit 310 further includes a first group of amplifiers B1 to BN serially connected between the logic driving circuit LD and the gate of the first transistor M1, and a second group of amplifiers A1 to AN serially connected between the logic driving circuit LD and the gate of the second transistor M2.

Figure 5:
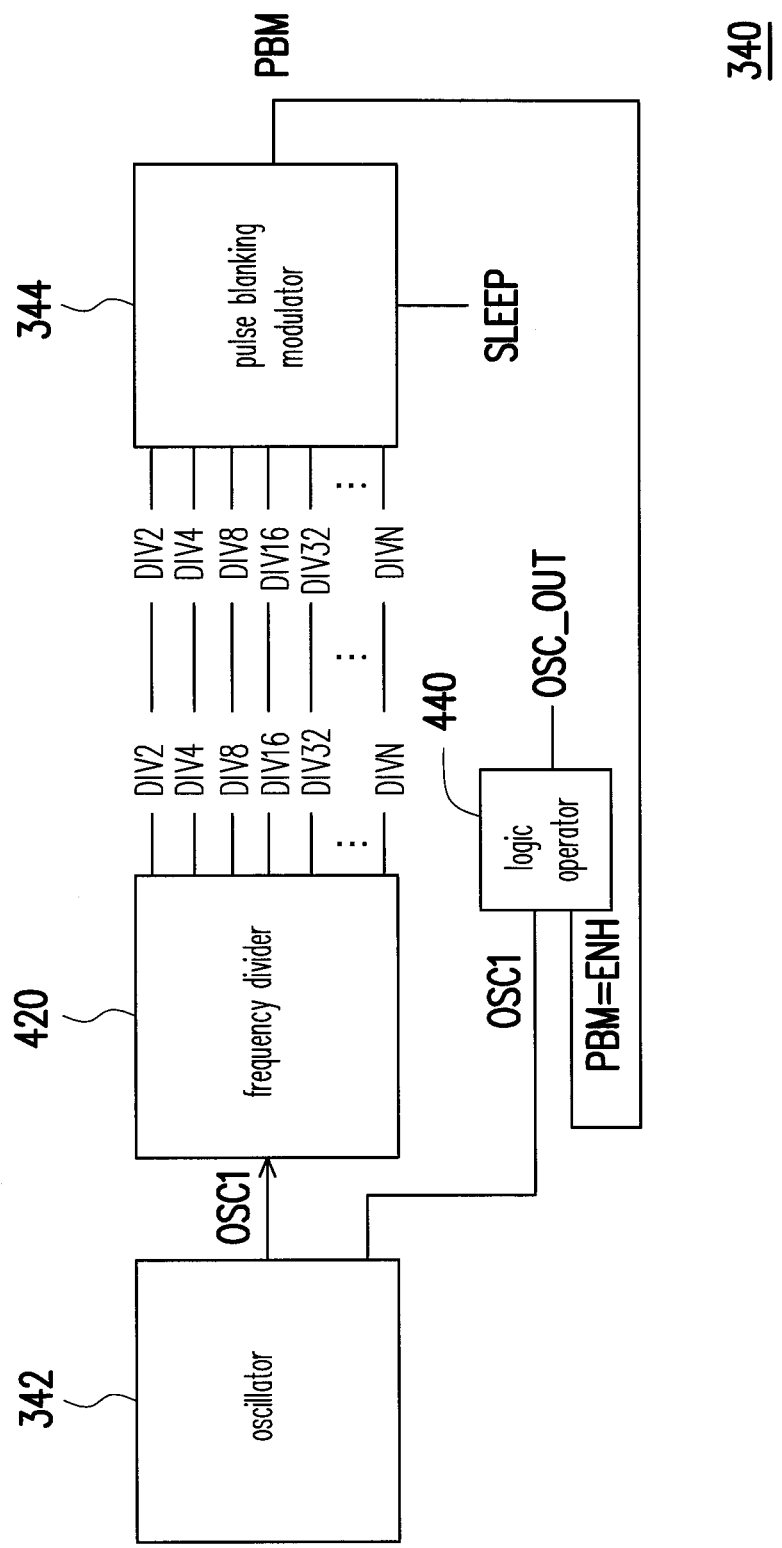
FIG. 5 is a schematic diagram of a clock control unit of a control circuit for the switching regulator according to an embodiment of the invention.

FIG. 5 illustrates a schematic diagram of a clock control unit of a control circuit for the switching regulator according to an embodiment of the invention. Referring to FIG. 4 and FIG. 5 together, in the present exemplary embodiment, the clock control unit 340 is coupled to the switching regulator 30 (the logic driving unit 310, the regulator adjusting circuit 320 and the feedback control circuit 350). In the present exemplary embodiment, the clock control unit 340 is capable of generating the control signal PBM and the control signal ENH (the control signal PBM is equal to ENH in the present exemplary embodiment) according to clock periods T1 of the switching regulator in the sleep mode and an capacitance of the output capacitor Cout, and controlling the output voltage VOUT of the switching regulator in the sleep mode according to the control signals PBM and ENH. In the present exemplary embodiment, the clock control unit 340 may output the control signal PBM after a signal that instructs to enter the sleep mode is received (e.g., after a sleep signal SLEEP is received). It should be noted that, the control signal PBM may be a fixed value or may be instantly changed according to current states. A fixed PBM signal means that a signal preset value is stored in the clock control unit 340, and the fixed PBM signal is generated according the signal preset value. Thus, in the present exemplary embodiment, a pulse width T of each of the clock periods T1 of the control signal PBM (ENH) of the control circuit 300 in the sleep mode is substantially the same. Namely, the clock periods T1 of the control circuit 300 are not related to the feedback voltage VFB. In other embodiment, a dynamically-variable PBM signal means that the clock control unit 340 may detect the output voltage VOUT or the current load Iload and thereby adjust the control signal PBM in order to blank a portion of an oscillation signal OSC1.

As shown in FIG. 5, the clock control unit 340 includes the oscillator 342, a frequency divider 420, the pulse blanking modulator 344 and a logic operator 440. The oscillator 342 provides the oscillation signal OSC1. The frequency divider 420 is coupled between the oscillator and the pulse blanking modulator 430, and the frequency divider 420 is configured to divide a frequency of the oscillation signal OSC1 in order to generate a frequency-divided oscillation signal (DIV2 to DIVN). When the sleep signal SLEEP is received, the pulse blanking modulator 344 generates the control signals PBM and ENH according to the frequency-divided oscillation signal (DIV2 to DIVN) in order to blank the portion of the oscillation signal OSC1, so that the clock control unit 340 may maintain the output electrical signal in the sleep mode of the switching regulator 30 within the predetermined range according to the control signals PBM and ENH. In the present exemplary embodiment, the output electrical signal is the output voltage VOUT. However, in other embodiments which are not illustrated, the output electrical signal may also be an output current. In the present exemplary embodiment, the logic operator 440 is coupled to the oscillator 342 and the pulse blanking modulator 344, and configured to generate the clock signal OSC_OUT according to the oscillation signal OSC1 and the control signal PBM. In the present exemplary embodiment, the logic operator 440 may be a logic AND operator for performing a logic AND operation on the oscillation signal OSC1 and the control signal PBM in order to generate the clock signal OSC_OUT, but the invention is not limited thereto.

Figure 6:
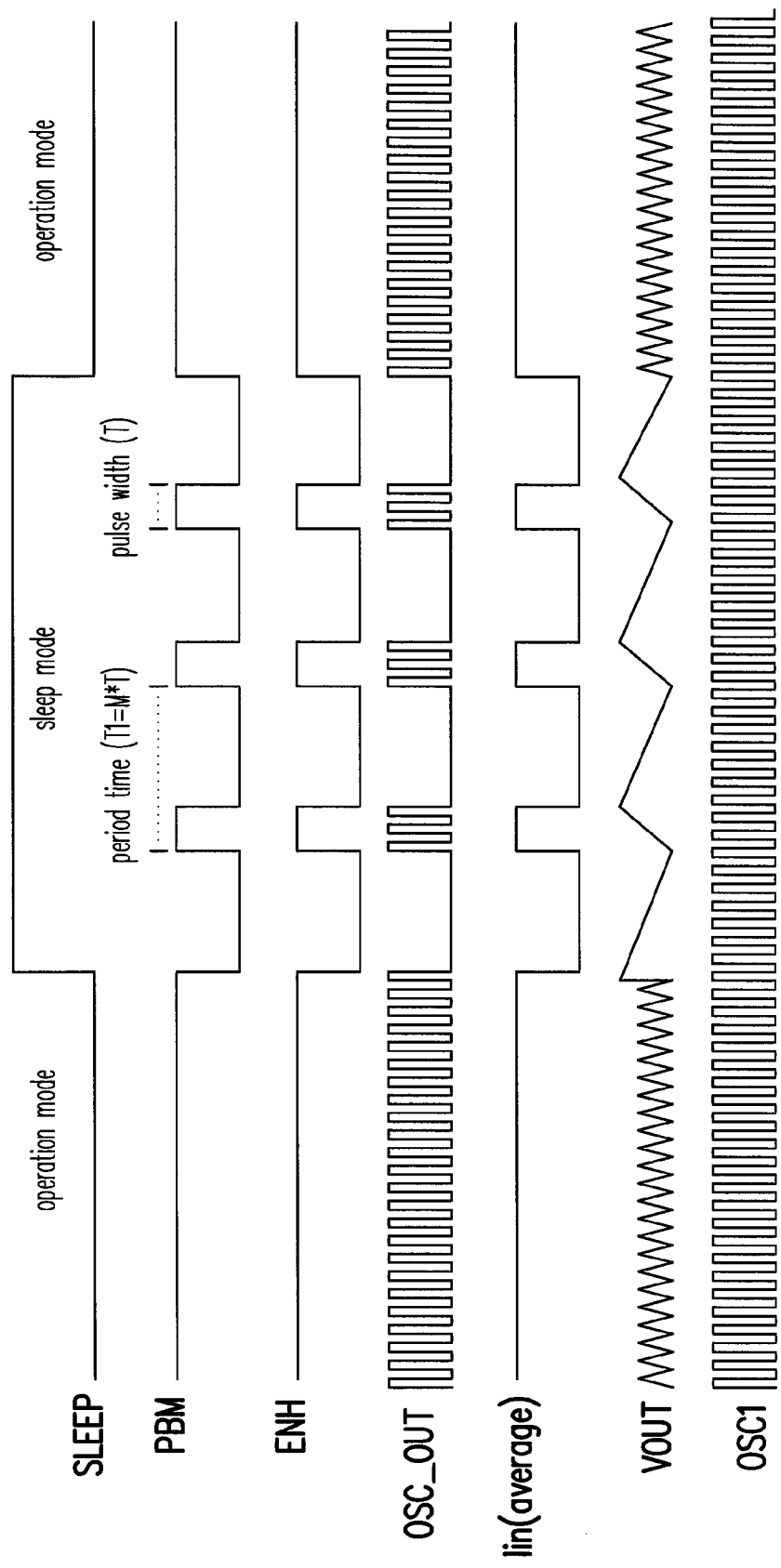
FIG. 6 is a signal waveform diagram of a control circuit for the switching regulator according to an embodiment of the invention.

FIG. 6 illustrates a signal waveform diagram of a control circuit for the switching regulator according to an embodiment of the invention. When the switching regulator of FIG. 3 in the nos-load state (Iload=0) or the light-load state enters the sleep mode, the pulse blanking modulator 340 will receive the sleep signal SLEEP. After the sleep signal SLEEP is passed to the clock control unit 340, the control signal PBM (ENH) is generated, and the clock signal OSC_OUT is generated by performing the logic AND operation on the control signal and the oscillation signal OSC1. A timing waveform of the clock signal OSC_OUT is as shown in FIG. 5, and the clock period T1 of the control signal PBM (ENH) is M times a pulse width T. By using the control signal PBM (ENH), the clock control unit 340 may control operations of the voltage comparator COMP3, the inductive current detection circuit ISEN, the slope compensation circuit ISLOP, the oscillator 342, the latch FF1, the logic driving unit 310 and the power circuit 330, which are depicted in FIG. 4 and FIG. 5. As shown in the timing diagram of FIG. 6, the control circuit 300 for the switching regulator only operates the voltage comparator COMP3, the inductive current detection circuit ISEN, the slope compensation circuit ISLOP, the oscillator 342, the latch FF1, the logic driving unit 310 and the power circuit 330 for a time T after being waited for the clock period T1 each time. Accordingly, a current consumption Iin(average) of an operating current the entire switching regulator in the sleep mode may be obtained according to a formula: Iin(average)=I(VDDA)/M. That is, the current consumption Iin(average) may be obtained by an I(VDDA) divided by M. Thus, the control circuit for the switching regulator of the present exemplary embodiment is capable of achieving ultra low current consumption in the sleep mode.

In addition, as shown in the timing diagram of FIG. 6, the output voltage VOUT of the switching regulator 30 of FIG. 3 may be obtained according to a formula: ΔVOUT=[(Iload)*T1]/Cout. Accordingly, as long as a proper capacitance of the output capacitor Cout and the clock period T1 can be obtained through calculation, the control circuit for the switching regulator of the present exemplary embodiment is capable of maintaining the output voltage VOUT of a voltage regulator within a normal operation range. Thus, an architecture of the control circuit of FIG. 3 is capable of ensuring that the switching regulator still has a ultra low standby operating current in the sleep mode.

For instance, it is assumed that the oscillation signal OSC1 is 1.5 MHz, in which the pulse width is equal to 0.66 usec, the current load Iload is 2 mA, and the output capacitor Cout is 10 uF. After the control signal PBM (ENH) is generated through the frequency divider 420 and the pulse blanking modulator 430, the pulse width T is equal to 8*0.66 usec=5.28 usec. The clock period T1 is equal to 64*5.28 usec=337.9 usec. Therefore, from said formula for ΔVOUT, it can be inferred that ΔVOUT=(2 mA*337.9 usec)/10 uF=67.58 mV. However, the example provided above is merely exemplary, and the invention is not limited only to the aforesaid embodiment.

Figure 7A:
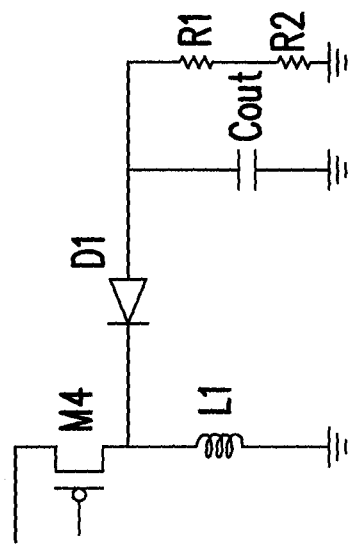
FIGS. 7A and 7B illustrate a regulator adjusting circuit of a control circuit for the switching regulator.
Figure 7B:
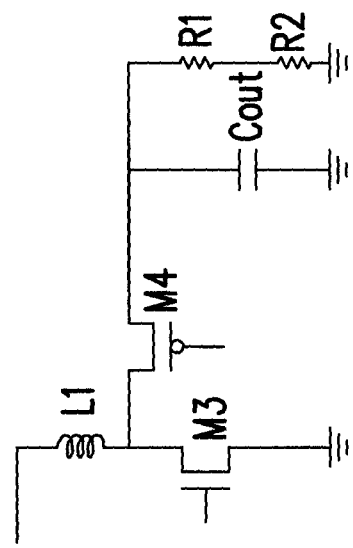

In addition, although the regulator adjusting circuit 320 depicted in FIG. 4 is a buck regulator adjusting circuit, in other embodiments of the invention, the regulator adjusting circuit 320 may be a boost regulator adjusting circuit, a buck/boost regulator adjusting circuit or an inverting regulator adjusting circuit. Accordingly, the switching regulator in different types may still have the ultra low standby operating current in the sleep mode. For example, FIGS. 7A and 7B illustrate a regulator adjusting circuit of a control circuit for the switching regulator. Types of transistors M3 and M4 and the inductor L1 in a regulator adjusting circuit 620A of FIG. 7A make the regulator adjusting circuit 620A the boost regulator adjusting circuit. A regulator adjusting circuit 620B of FIG. 7B further includes a diode D1 coupled between the power circuit and the output capacitor to make the regulator adjusting circuit 620B the inverting regulator adjusting circuit.

Figure 8:
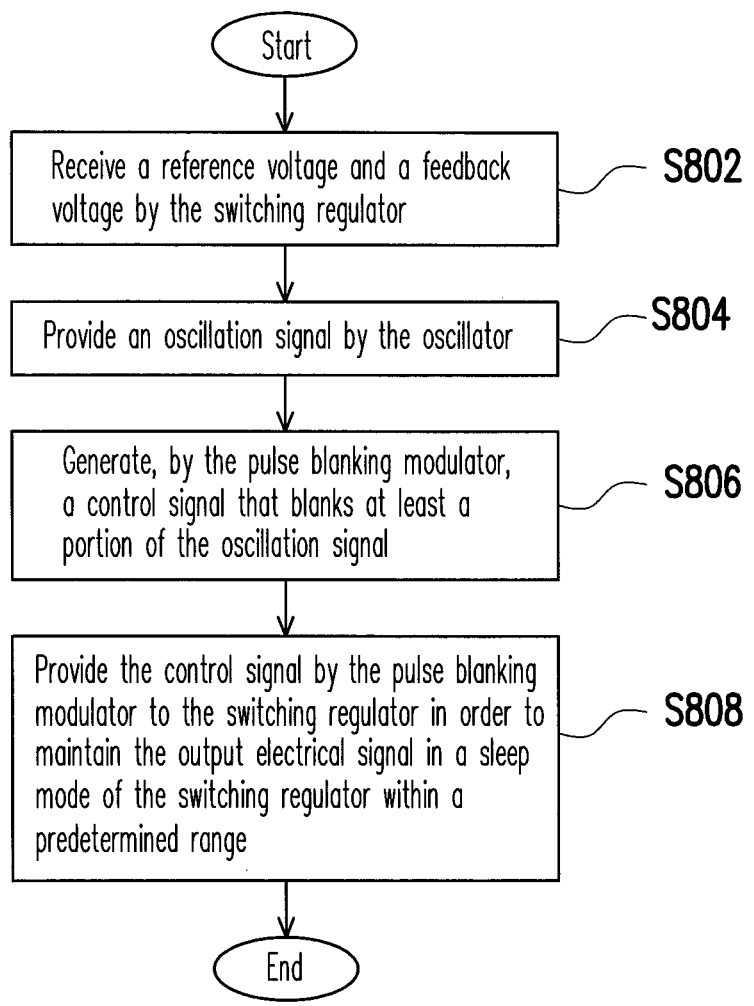
FIG. 8 is a flowchart illustrating a method for regulating electrical signal according to an embodiment of the invention.

FIG. 8 is a flowchart illustrating a method for regulating electrical signal according to an embodiment of the invention.

Referring to FIG. 5802, the switching regulator 30 receives the reference voltage VREF and the feedback voltage VFB. In step S804, the oscillator 342 provides the oscillation signal OSC1. In step S806, the pulse blanking modulator 344 generates the control signal PBM that blanks at least a portion of the oscillation signal OSC1. In step S808, the pulse blanking modulator 344 provides the control signal PBM to the switching regulator 30 in order to maintain the output electrical signal in a sleep mode of the switching regulator 30 within a predetermined range.

In an exemplary embodiment, the step of generating, by the pulse blanking modulator 344, the control signal PBM that blanks the at least the portion of the oscillation signal OSC1 includes: The frequency divider 420 divides a frequency of the oscillation signal OSC1 in order to generate the frequency-divided signal (DIV2 to DIVN). When the sleep signal SLEEP is received by the pulse blanking modulator 344, the pulse blanking modulator 344 generates the control signal PBM according to the frequency-divided oscillation signal (DIV2 to DIVN). In addition, the logic operator 440 generates the clock signal OSC_OUT according to the oscillation signal OSC1 and the control signal PBM.

In an exemplary embodiment, the output electrical signal is the output voltage VOUT.

In an exemplary embodiment, the output electrical signal is the output current.

In an exemplary embodiment, the pulse blanking modulator 344 adjusts the control signal PBM according to the output voltage VOUT in order to blank at least the portion of the oscillation signal OSC1.

In an exemplary embodiment, the pulse blanking modulator 344 adjusts the control signal PBM according to the current load Iload in order to blank at least the portion of the oscillation signal OSC1.

In an exemplary embodiment, the control signal PBM is a fixed value.

In summary, according to the embodiments of the invention, in the control circuit for the switching regulator and the method for regulating electrical signal, the clock control unit with the pulse banking modulation mechanism is adopted. Accordingly, as long as the proper values of the output capacitor and the clock period of the control signal can be obtained through calculation, the control circuit for the switching regulator of the present exemplary embodiment is capable of maintaining the output electrical signal of the voltage regulator within the normal operation range. Moreover, it can also be ensured that the switching regulator still different types may include the ultra low standby operating current in the sleep mode.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control circuit for a switching regulator, comprising:
the switching regulator, regulating an output electrical signal according to a clock signal, a reference voltage and a feedback voltage;
a clock control unit, coupled to the switching regulator, wherein the clock control unit comprises:
an oscillator, providing an oscillation signal;
a pulse blanking modulator, coupled to the oscillator and configured to receive a sleep signal indicating to enter a sleep mode of the switching regulator and generate a control signal that blanks at least a portion of the oscillation signal in response to the sleep signal, wherein the clock control unit provides the control signal in order to maintain the output electrical signal in the sleep mode of the switching regulator within a predetermined range; and
a logic operator, coupled to the oscillator and the pulse blanking modulator and configured to receive the oscillation signal from the oscillator and the control signal from the pulse blanking modulator,
wherein the logic operator is further configured to generate the clock signal transmitted to the switching regulator according to the oscillation signal and the control signal,
wherein a clock frequency of the oscillation signal is maintained at a first clock frequency in the sleep mode,
wherein a clock frequency of the clock signal is changed from the first clock frequency to a second clock frequency in response to the control signal in the sleep mode,
wherein the first clock frequency is different from the second clock frequency.

2. The control circuit for the switching regulator of claim 1, wherein the clock control unit further comprises:
a frequency divider, coupled between the oscillator and the pulse blanking modulator, and configured to divide a frequency of the oscillation signal in order to generate a frequency-divided oscillation signal, wherein when the sleep signal is received by the pulse blanking modulator, the pulse blanking modulator generates the control signal according to the frequency-divided oscillation signal.

3. The control circuit for the switching regulator of claim 2, wherein a pulse width of each of clock periods of the control signal in the sleep mode is substantially the same.

4. The control circuit for the switching regulator of claim 1, wherein the switching regulator comprises:
a regulator adjusting circuit, coupled to a logic driving unit and a feedback control circuit, and the regulator adjusting circuit comprising:
a power circuit, having a first terminal for receiving an operating voltage, a second terminal for receiving a gate voltage, and a third terminal coupled to a ground;
a voltage division circuit, coupled to the power circuit, and configured to provide the feedback voltage; and
an output capacitor, having a first terminal coupled to the voltage division circuit and the power circuit, and a second terminal coupled to the ground;
the feedback control circuit, coupled to the regulator adjusting circuit and the logic driving unit, and the feedback control circuit comprising:
an operation amplifier, coupled to the voltage division circuit and a reference voltage, wherein the operation amplifier controls a magnitude of a first comparator input voltage according to an error between the reference voltage and the feedback voltage; and
a comparator, coupled to the clock control unit and the operation amplifier, and configured to compare the first comparator input voltage with a second comparator input voltage according to the control signal in order to generate a comparison result;
the logical driving unit, comprising:
a latch, coupled to the clock control unit and the comparator, and configured to receive the clock signal from the clock control unit and the comparison result from the comparator in order to generate a latch output; and
a logic driving circuit, coupled to the clock control unit and the latch, and configured to provide the gate voltage to the second terminal of the power circuit according to the control signal and the latch output.

5. The control circuit for the switching regulator of claim 4, wherein the regulator adjusting circuit further comprises:
an inductor, having a first terminal coupled to the power circuit, and a second terminal coupled to the output capacitor and the voltage division circuit.

6. The control circuit for the switching regulator of claim 4, wherein the power circuit of the regulator adjusting circuit comprises:
a first transistor, having a drain coupled to a source of a second transistor, a gate coupled to the gate voltage, and a source coupled to the ground; and
the second transistor, having a drain coupled to the operating voltage, a gate coupled to the gate voltage, and the source coupled to the drain of the first transistor.

7. The control circuit for the switching regulator of claim 4, wherein the feedback control circuit further comprises:
an inductive current detection circuit and a slope compensation circuit, for generating the second comparator input voltage according to the control signal.

8. The control circuit for the switching regulator of claim 4, wherein the logic driving unit further comprises:
a first group of amplifiers, serially connected between the logical driving circuit and the gate of the first transistor; and
a second group of amplifiers, serially connected between the logical driving circuit and the gate of the second transistor.

9. The control circuit for the switching regulator of claim 4, wherein the regulator adjusting circuit is a buck regulator adjusting circuit.

10. The control circuit for the switching regulator of claim 4, wherein the regulator adjusting circuit is a boost regulator adjusting circuit.

11. The control circuit for the switching regulator of claim 4, wherein the regulator adjusting circuit further comprises a diode coupled between the power circuit and the output capacitor, and the regulator adjusting circuit is an inverting regulator adjusting circuit.

12. The control circuit for the switching regulator of claim 1, wherein the output electrical signal is an output voltage.

13. The control circuit for the switching regulator of claim 12, wherein the clock control unit adjusts the control signal according to the output voltage in order to blank at least the portion of the oscillation signal.

14. The control circuit for the switching regulator of claim 1, wherein the output electrical signal is an output current.

15. The control circuit for the switching regulator of claim 1, wherein the clock control unit adjusts the control signal according to a current load in order to blank at least the portion of the oscillation signal.

16. The control circuit for the switching regulator of claim 1, wherein the control signal is a fixed value.

17. A method for regulating electrical signal, adapted to a control circuit for the switching regulator, wherein the control circuit for the switching regulator comprises a switching regulator, an oscillator, a pulse blanking modulator, and the method for regulating electrical signal comprises:
  receiving a clock signal, a reference voltage and a feedback voltage by the switching regulator;
  providing an oscillation signal by the oscillator;
  receiving, by the pulse blocking modulator, a sleep signal indicating to enter a sleep mode of the switching regulator;
  generating, by the pulse blanking modulator, a control signal that blanks at least a portion of the oscillation signal in response to the sleep signal;
  providing the control signal by the pulse blanking modulator to the switching regulator in order to maintain the output electrical signal in the sleep mode of the switching regulator within a predetermined range;
  receiving, by a logical operator, the oscillation signal from the oscillator and the control signal from the pulse blanking modulator; and
  generating, by the logical operator, the clock signal transmitted to the switching regulator according to the oscillation signal and the control signal,
  wherein a clock frequency of the oscillation signal is maintained at a first clock frequency in the sleep mode, wherein a clock frequency of the clock signal is changed from the first clock frequency to a second clock frequency in response to the control signal in the sleep mode, and wherein the first clock frequency is different from the second clock frequency.

18. The method for regulating electrical signal of claim 17, wherein the control circuit for the switching regulator further comprises a frequency divider and a logic operator, and the step of generating, by the pulse blanking modulator, the control signal that blanks the at least the portion of the oscillation signal comprises:
  dividing a frequency of the oscillation signal by the frequency divider to generate a frequency-divided oscillation signal, wherein when the sleep signal is received by the pulse blanking modulator, the pulse blanking modulator generates the control signal according to the frequency-divided oscillation signal.

19. The method for regulating electrical signal of claim 17, wherein the output electrical signal is an output voltage.

20. The method for regulating electrical signal of claim 19, wherein the pulse blanking modulator adjusts the control signal according to the output voltage in order to blank at least the portion of the oscillation signal.

21. The method for regulating electrical signal of claim 17, wherein the output electrical signal is an output current.

22. The method for regulating electrical signal of claim 17, wherein the pulse blanking modulator adjusts the control signal according to a current load in order to blank at least the portion of the oscillation signal.

23. The method for regulating electrical signal of claim 17, wherein the control signal is a fixed value.

* * * * *